Nov. 14, 1939.    J. A. ZUBLIN    2,179,570
METHOD AND MEANS OF AERIAL NAVIGATION
Filed Jan. 21, 1937    2 Sheets-Sheet 1

Inventor
John A. Zublin.

Patented Nov. 14, 1939

2,179,570

UNITED STATES PATENT OFFICE 2,179,570

METHOD AND MEANS OF AERIAL NAVIGATION

John A. Zublin, Los Angeles, Calif.

Application January 21, 1937, Serial No. 121,404

8 Claims. (Cl. 250—11)

This invention relates to improvements in the manner of navigating an airship. It is particularly applicable to control of the airship over a mountainous or hilly region and in guiding it to its terminus, at night, during storms, and on days of poor visibility.

Heretofore, airships have been navigated by means of radio beams. However, this system is far from fool-proof, since it fails to indicate to the pilot the proximity of the ground and also because of interference phenomena which prevent the reception of a proper signal or any signal.

Accordingly, it is an object of this invention to improve methods of aerial navigation.

It is a further object of this invention to eliminate the possibility of interference phenomena from having any effect on the reception of the signal at the airship.

It is a further object of this invention to indicate the distance of the airship above the earth's terrain.

It is a further object of this invention to maintain the airship at a selected height above the earth's terrain.

It is still a further object of this invention to maintain an airship on a more accurate course between any two given points.

These objects and others will better be understood from a consideration of the accompanying drawings, in which.

With the prior systems of aerial navigation, the pilot flies the airship along the radio beam, in many instances the sending station being a substantial distance from the airship. Because of interference phenomena, and especially in inclement weather, the airship is unable to receive an intelligible signal, or for that matter, any signal whatever. If the point of sending of the signal were relatively close to the airship, the danger of interference phenomena affecting the reception would be eliminated. In view of this fact, I have devised a method in which the pilot flies his airship above and along an electrical conductor, which extends along the course over which the airship is to be flown. From this conductor throughout its length there emanates a signal or signals of certain characteristics. In this manner, the airship would be, at all times, only a relatively short distance away from a source of signal. Accordingly, interference phenomena, such as magnetic effects of minerals in the ground, electrical atmospherical disturbances, etc., would have practically no effect on the reception of the signal in the airship, because of the short distance that the signal must be transmitted, and in view of the fact that in transmitting a strong signal over a very short distance its strength is maintained and unaffected by extraneous sources.

Figure 1:
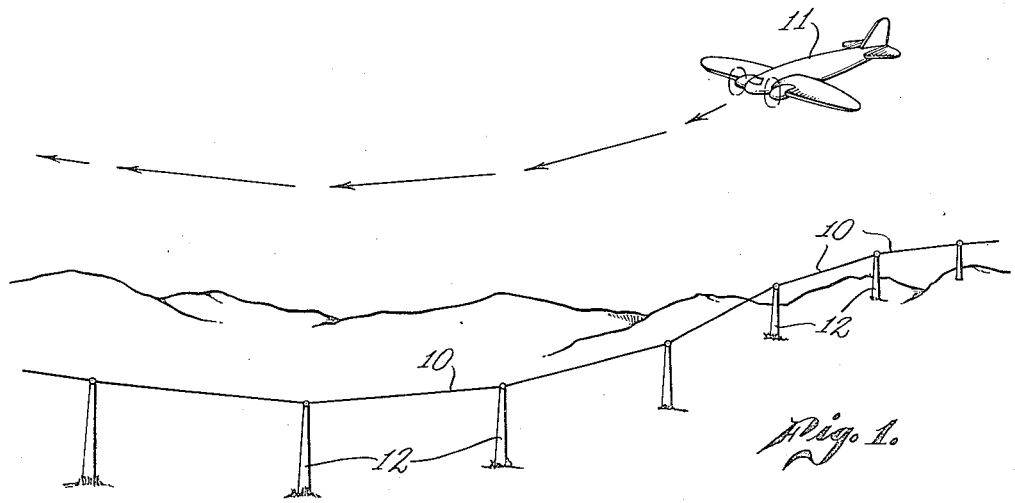
Fig. 1 is a perspective view of one embodiment of my invention.

One manner of carrying out my invention is illustrated in Fig. 1, wherein an electrical conductor 10 is shown as being suspended between suitable supports 12 above the ground. The airship is designated as flying at a sufficiently safe altitude above and substantially parallel to the conductor. From the conductor electric waves are emanated upwardly toward the airship. The airship may have a directional antenna in connection with its receiving apparatus which would indicate to the navigator whether he is flying in the direction of the conductor directly above it or whether he has drifted either to the right or left thereof.

With the proper manipulation of the directional antenna mechanism, the navigator can determine the direction from which the signal emanates. For example, if he has drifted to the left of the vertical plane including the conductor, his directional antenna mechanism will indicate this fact, since the antenna will have to be inclined towards the conductor 10 in order to receive the proper signal. In this manner, whenever the navigator is receiving a signal with the directional antenna pointed vertically downwardly, he is apprised of the fact that he is flying directly over the conductor and consequently on his course.

An alternative method of using the arrangement disclosed in Fig. 1 would be to project a narrow directional beam by suitable means from conductor 10, and use a simple receiving apparatus in the airship. One very simple and relatively inexpensive manner of accomplishing this objective is to suspend a reflector in the form of a conductor 10a between the supports 12 and below the antenna 10. The electromagnetic waves emanating from the antenna and reflected upwardly by the wire 10a will reenforce those waves normally moving upwardly to provide a maximum signal strength receivable in the airship whenever the craft flies directly over the conductor. If the airship were to deviate from its course the signal strength received would be diminished. This would apprise the navigator of the fact that he had drifted from his course, and he would immediately take corrective measures. If he continued to deviate from his course, the signal strength would be further diminished, which would indicate to the navigator that his supposed correction has been in the wrong direction. Accordingly, the airship would be piloted in the other direction, whereupon the signal strength would be increased, and when it reached its maximum the navigator would know that he is directly over the conductor and on his course.

Figure 2:
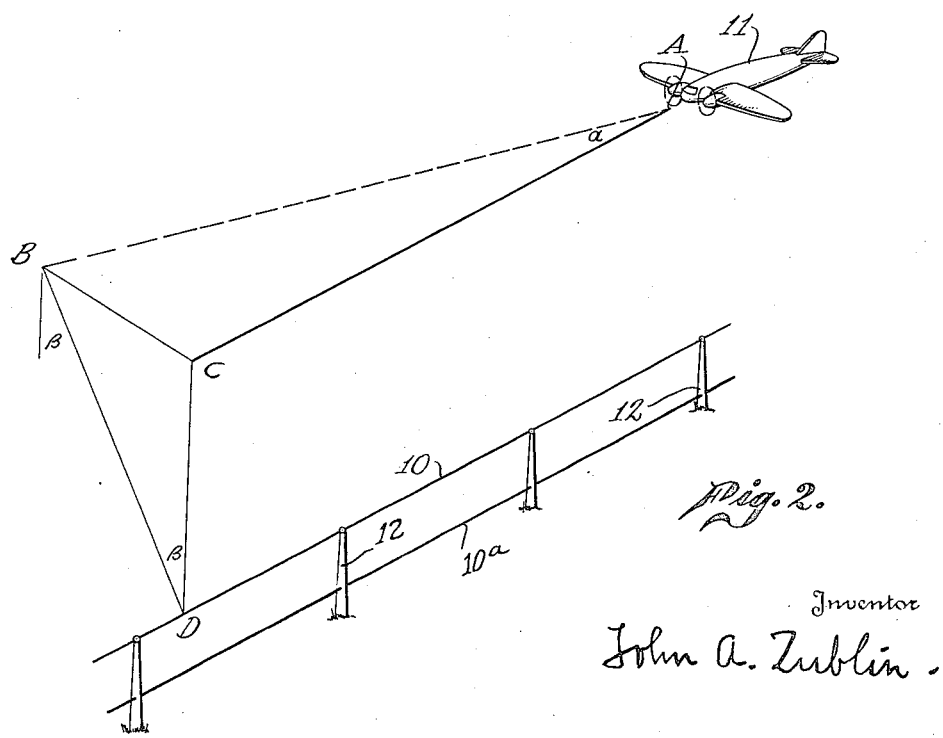
Fig. 2 is a perspective view, illustrating the method whereby the pilot may determine his approximate elevation above the ground.

By the use of the arrangement disclosed in Fig. 1, it is also possible to determine the height of the ship above the ground. This method will be explained in connection with Fig. 2.

When a directional antenna is used on the airship, the pilot can maintain his course directly above and substantially parallel to the conductor. In order to determine the height above ground, the airship is purposely deviated while in level flight from the straight course by a known angle such as alpha (see Fig. 2) for a known length of time along the line A—B. At the end of the fixed period of time, the distance along the line A—B on which the airship has been flown can be approximated, and since the angle alpha is known, the horizontal deviation B—C from the conductor 10 can be calculated readily. Upon arriving at the point B, the pilot would then manipulate the directional antenna until he received the proper signal from the conductor. This would indicate to him the angle beta. Knowing the distance B—C and also the angle beta, the distance C—D, or height above the conductor, could be calculated by the use of simple trigonometric procedure, or by the use of suitably prepared tables or curves.

By further deviating from this course, along the line A—B, the readings obtained on the directional antenna would change, increasing further the distance of the airship from its proper course. In this manner, the navigator may obtain several readings while the airship is flying along its deviated course, and make several calculations of the height above the conductor in order to obtain a better check on the airship's altitude.

The height of the airship above the conductor would be added to the average height of the conductor above the ground to obtain the height of the airship above the ground.

Figure 3:
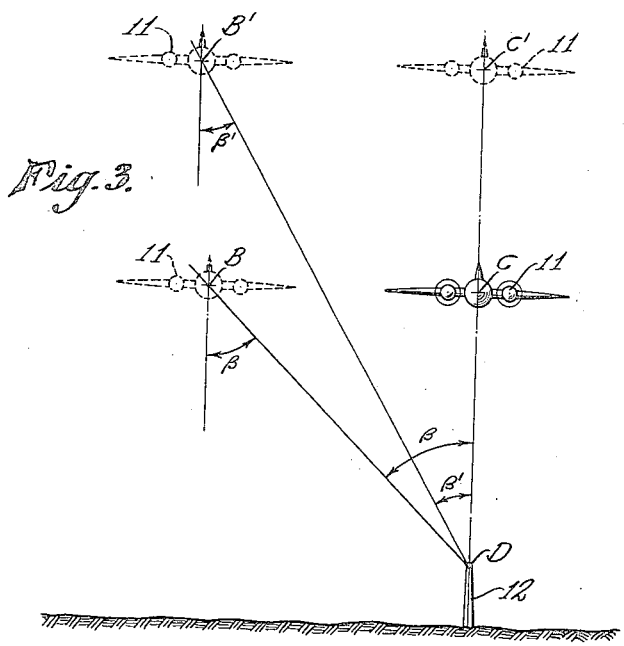
Fig. 3 is a front elevation of Fig. 2.

Fig. 3 is representative of the airship flying above the conductor at a higher altitude, as at the point C'. If the airship were deviated from its course to the same horizontal extent as previously, it would arrive at the point B'. Upon proper manipulation of the directional antenna toward the conductor at the point D, the smaller angular reading beta' would be obtainable. This, in itself, would indicate to the operator that his altitude has been increased. In general, it may be stated that for the same extent of deviation from the normal course of flight, the smaller the angle beta' through which the directional antenna must be moved to receive a proper signal from the conductor, the greater will be the altitude above the conductor.

After obtaining the desired information, the airship would then be piloted directly over and substantially parallel to the conductor in order to continue on its proper course.

Figure 4:
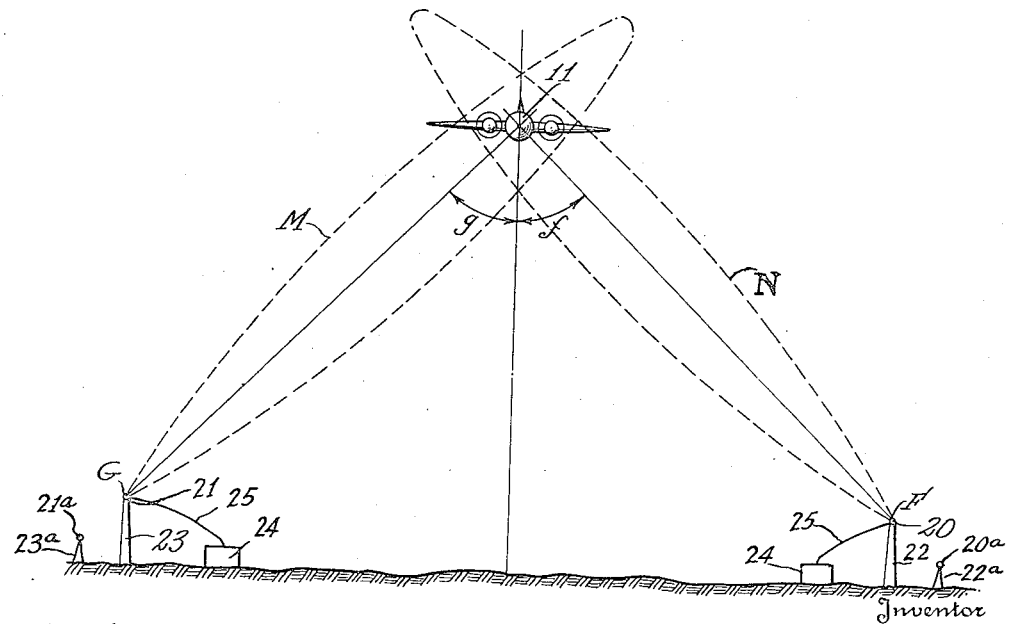
Fig. 4 is a modification of the arrangement disclosed in Fig. 1.

A variational manner of maintaining an airship on its course and also of keeping it at a fixed elevation above the conductor is illustrated in Fig. 4. Two electrical conductors 20 and 21 are disclosed as being suspended on suitable supports 22 and 23 above the ground, at a definite distance apart. There emanates from each conductor a signal with a certain characteristic, the signals being supplied by signal generators 24 connected with each conductor by lead wire 25. Normally the airship is flown above and between the conductors at an altitude sufficient for safety. By manipulating a single directional antenna in the airship toward the respective conductors, 20 and 21, the pilot may determine the vertical distance above the conductors. His procedure would be to turn the antenna until he received a proper signal from the conductor 21, which would give the reading of the angle $g$. The antenna would then be manipulated toward the conductor 20 until the proper signal were received therefrom. The navigator would thereby obtain a reading of the angle $f$. If the angles are equal, the ship will be approximately midway between the conductors, and the pilot will know that he is on his proper course. However, any discrepancy between the angles $g$ and $f$ will immediately indicate to the pilot the extent of deviation from his course. Knowing the distance between the conductors 20 and 21, and angle $g$ plus $f$, the operator of the airship can determine readily his height above the conductors, and he can maintain this elevation by taking proper readings at frequent intervals.

The conductors 20 and 21 may be placed a suitable distance apart, and this distance can be varied in accordance with the contour of the earth in that particular region. It would be desirable to vary the distance in hilly or mountainous country since in that type of region one conductor, such as 21, may be at a different altitude from the other conductor 20. Under this condition, by varying the horizontal distance between the conductors the total angle $g$ plus $f$ may be maintained constant in order to keep the airship at approximately constant height above ground.

It is also possible to guide an airship downwardly toward the landing field at the terminus. By bringing the conductors closer together as the field is approached, the maintenance of the same constant angle $g$ plus $f$ as was used previously would decrease the elevation of flight of the airship and as the terminus is approached further a closer bringing together of these conductors would further decrease the altitude of the airship provided the pilot maintained the same constant angle of $g$ and $f$. In this manner the airship could be guided downwardly toward the landing field.

A possible variation of the method outlined in connection with Fig. 4 is by the use of two directional antenna in the airship, in order to determine the angles $g$ and $f$ substantially simultaneously. Still a further modification resides in the transmission of a directional beam from each conductor as indicated by the dotted lines M, N. By an arrangement similar to that described in connection with Fig. 2, reflector wires 20a, 21a would be suspended between respective supports 22a, 23a to intensify the signals projected upwardly from the conductors 20, 21. The reflectors 20a and 21a would be so positioned that lines drawn between each of them and their antenna 20 or 21 would make the desired angle $f$ or $g$ with the vertical. With this latter arrangement, so long as the operator is receiving signals from both conductors he knows that he is on his proper course and also that he is maintaining a safe elevation.

It is to be understood that it is not essential to use a continuous conductor. The conductor may include several or many discontinous lengths along the projected course of flight, and the signal characteristic emanating from each length could differ or be varied, as desired.

Although I have shown several applications of my invention, it will be understood that it may be embodied in various other forms and methods, being capable of change without departing from the spirit and scope of my invention; and it is to be understood that the foregoing description is to be considered as illustrative of rather than restrictive upon the scope of the invention described in the appended claims.

I claim as my invention:

1. A method of determining the height above ground of an airship comprising projecting electromagnetic waves from a source extending along the desired course of the airship, flying said airship over and substantially parallel to said source, deviating said airship from such substantially parallel flight in a given plane by a known amount, and measuring at the airship in a plane substantially at right angles to said given plane, through reception of said waves, the direction of said source with respect to the airship.

2. A method of determining the height above ground of an airship comprising projecting electromagnetic waves from a source extending along the desired course of the airship, flying said airship over and substantially parallel to said source, deviating said airship from such substantially parallel flight in a generally horizontal plane by a known amount, and measuring at the airship in a generally vertical plane, through reception of said waves, the direction of said source with respect to the airship.

3. A method of determining the height of an airship above ground comprising projecting electromagnetic waves from a source extending along the desired course of the airship, flying said airship over and substantially parallel to said source, deviating said airship by a known angle from such flight in a generally horizontal plane for a known distance whereby to determine the horizontal distance of deviation of said airship from said desired course of flight, and measuring at the airship in a generally vertical plane, through reception of said waves, the angular direction of said source with respect to the airship, whereby the height of said airship can be determined through correlation between said horizontal distance of deviation and said angle measured in a vertical plane.

4. A system of aerial navigation comprising at least two generally parallel, spaced apart conductors extending along a desired course of flight in proximity to the ground and adapted to be energized by signal generators, the distance between said conductors decreasing in the vicinity of a landing field and as said field is approached, an airship to be maintained on the desired course, radio receiving apparatus in said airship, one or more directional antennae on said airship electrically connected with said receiving apparatus, and means in the airship for positioning said antennae with respect to the airship whereby the signal strength receivable from said conductors can be varied and the respective directions of said conductors relative to the airship noted for ascertaining the elevation of said airship.

5. A system of aerial navigation comprising two spaced apart conductors adapted to be energized by signal generators, said conductors converging toward one another in the vicinity of landing of an airship, radio receiving apparatus in said airship, one or more directional antennae on said airship electrically connected with said receiving apparatus, and means in the airship for positioning said antennae with respect to the airship whereby the signal strength receivable from said conductors can be varied and the respective directions of said conductors relative to the airship noted for ascertaining the elevation of said airship.

6. A system of aerial navigation including two spaced apart conductors adapted to be energized by signal generators, said conductors converging toward one another in the vicinity of landing of an airship, radio receiving apparatus in said airship, one or more directional antennae on said airship electrically connected with said receiving apparatus, and means cooperable with said antennae for indicating the respective directions of said conductors relative to the airship for ascertaining the elevation of said airship.

7. A method of landing an airship comprising projecting electromagnetic waves from separate sources converging toward one another in the vicinity of landing of said airship, noting the angular directions of reception of said waves from said respective sources, and flying said airship in the direction of convergence of said sources while maintaining said angular directions substantially constant.

8. A method of landing an airship comprising projecting electromagnetic waves from separate sources converging toward one another in the vicinity of landing of said airship, flying said airship above and between said sources and in the direction of their convergence while gradually losing altitude to maintain the angular direction of reception of said waves at the airship substantially constant.

JOHN A. ZUBLIN.